United States Patent
Corghi

(10) Patent No.: US 7,513,288 B2
(45) Date of Patent: Apr. 7, 2009

(54) TOOL FOR MAKING IT EASIER TO MOUNT A TYRE ONTO A RIM

(75) Inventor: Remo Corghi, Correggio (IT)

(73) Assignee: Corghi S.p.A., Corrveggio (IT)

( * ) Notice: Subject to any disclaimer, the term of this patent is extended or adjusted under 35 U.S.C. 154(b) by 332 days.

(21) Appl. No.: 11/390,353

(22) Filed: Mar. 28, 2006

(65) Prior Publication Data

US 2006/0260763 A1    Nov. 23, 2006

(30) Foreign Application Priority Data

May 17, 2005    (IT)    .................... RE20050016 U

(51) Int. Cl.
B60C 25/01    (2006.01)
(52) U.S. Cl. ...................... 157/1.17; 157/1.3
(58) Field of Classification Search .................. 157/1.1, 157/1.17, 1.3
See application file for complete search history.

(56) References Cited

U.S. PATENT DOCUMENTS

| | | | | |
|---|---|---|---|---|
| 1,507,208 A | * | 9/1924 | Schlenker | 157/1.17 |
| 2,314,127 A | * | 3/1943 | Colley et al. | 157/1.17 |
| 2,520,330 A | * | 8/1950 | Northrup et al. | 157/1.17 |
| 2,581,086 A | * | 1/1952 | Edenfield et al. | 157/1.17 |
| 2,606,602 A | * | 8/1952 | Manupello | 157/1.17 |
| 2,900,016 A | * | 8/1959 | Woodward | 157/1.17 |
| 2,901,029 A | * | 8/1959 | Mraz | 157/1.17 |
| 3,240,252 A | * | 3/1966 | Ruhland et al. | 157/1.17 |
| 3,253,640 A | * | 5/1966 | Paulauskas | 157/1.17 |
| 3,771,580 A | * | 11/1973 | Branick | 157/1.17 |
| 4,589,462 A | | 5/1986 | Giles | |
| 4,785,865 A | * | 11/1988 | Folstad | 157/1.17 |
| 4,787,433 A | * | 11/1988 | Thomas | 157/1.17 |
| 4,890,661 A | * | 1/1990 | Goebel | 157/1.3 |
| 4,913,770 A | | 4/1990 | Sims | |
| 4,993,467 A | | 2/1991 | Stavinoha | |
| RE33,892 E | * | 4/1992 | Sims | 157/1.17 |
| 6,269,861 B1 | | 8/2001 | Tran | |
| 6,516,855 B2 | | 2/2003 | Corghi | |
| 2001/0042601 A1 | * | 11/2001 | Corghi | 157/1.26 |

FOREIGN PATENT DOCUMENTS

IT    RE2002U000004    2/2002

* cited by examiner

*Primary Examiner*—D. S Meislin
(74) *Attorney, Agent, or Firm*—Browdy and Neimark, P.L.L.C.

(57) ABSTRACT

Tool for mounting a tire onto a rim, suitable for making it easier to insert the bead of the tire under the bead-stopping edge of the rim and inside the channel of the rim itself; said tools comprises a body equipped with a fixed jaw and with a mobile jaw to which actuation means are operatively connected suitable for taking said mobile jaw closer to said fixed jaw to lock said body to the edge of the rim, a base intended to be rested on the sidewall of the tire being associated with said body, said base being fixedly connected to said body so as to be able to oscillate towards the axis of the rim to make it easier to insert the bead inside the bead-stopping edge of the rim.

7 Claims, 4 Drawing Sheets

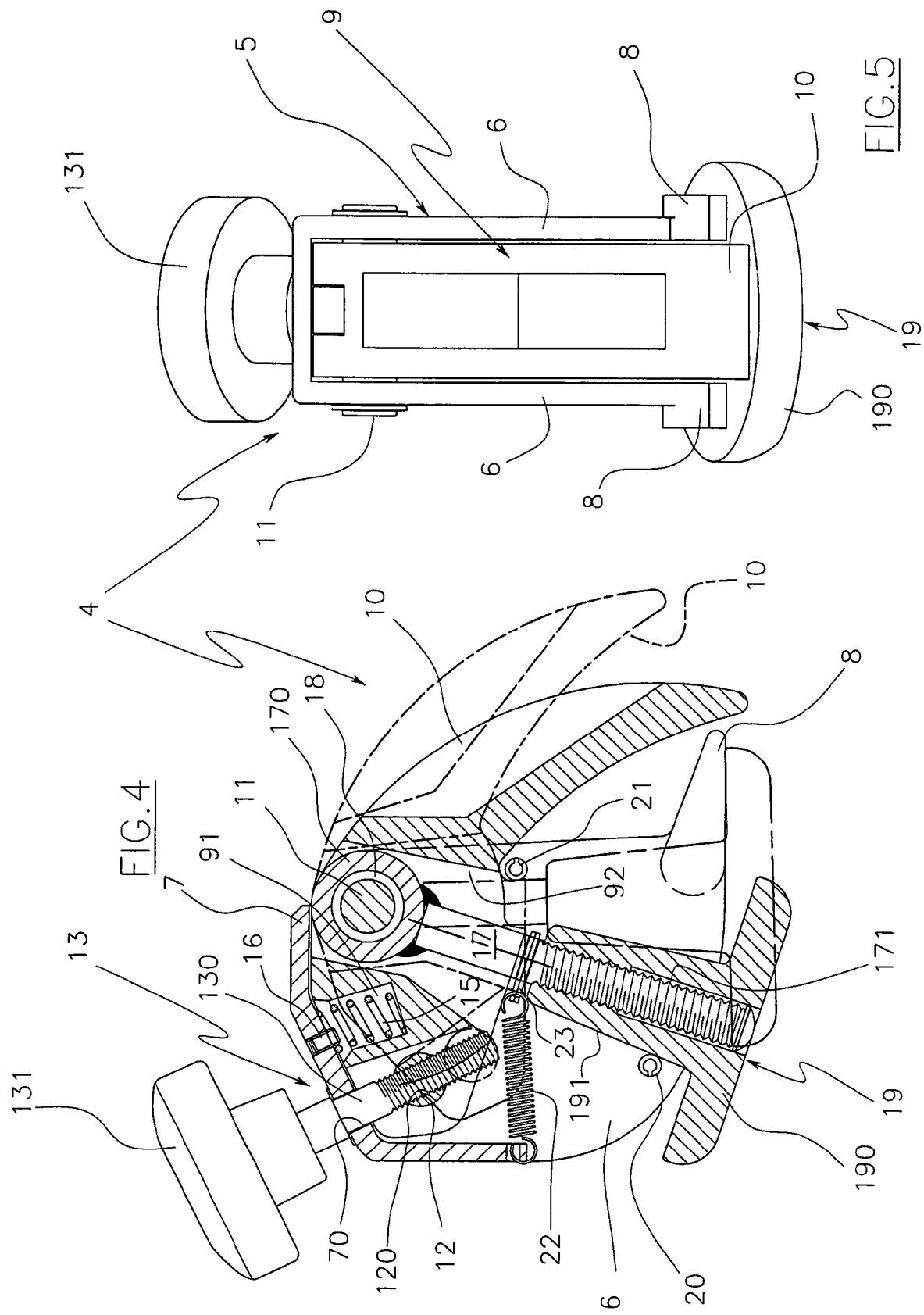

TOOL FOR MAKING IT EASIER TO MOUNT A TYRE ONTO A RIM

BACKGROUND OF THE INVENTION

1. Technical Field of the Invention

The present model concerns a tool used in the mounting operation of a tyre onto a rim.

2. Prior Art

The mounting of a tyre onto a rim foresees taking the bead of the tyre below the bead-stopping edge in the channel of the rim. This operation is carried out with the help of per se known tyre-dismounting machines, which are equipped with a tool the function of which is to press upon the sidewall of the tyre or upon the bead, whilst the rim is made to rotate, in order to insert the bead into the suitable seat of the rim.

To make this operation easier a tool is known that is described and illustrated in Italian patent application for a utility model no. RE2002U000004 to the same Applicant.

In brief said tool comprising a body equipped with a base (or fixed jaw) and with a mobile jaw to which means are operatively connected suitable for bringing said mobile jaw closer to said fixed jaw to jam the edge of the rim between them so as to lock said body to the edge of the rim. The lower surface of the base, when the tool is fixed to the edge of the rim, presses against the sidewall of the tyre so as to keep the bead of the tyre distanced from the edge of the rim and allow it to slide in the radial direction, during the rotation of the wheel, inside the central channel of the rim. The surface of the tool is shaped in such a way as to promote the sliding thereof.

The tool described above, whilst performing the function for which is intended perfectly well, even when it is used to mount very rigid and large tyres, has proven not very effective in mounting Run Flat tyres, i.e. the type of tyres that allows the vehicle to travel even in conditions of low tyre pressure.

It has been found that during the mounting of these types of tyres, using the device described above, the sidewall of the tyre does not slide with respect to the base of the device, not even if the latter is lubricated, and consequently the bead of the tyre is not easily directed towards the channel of the rim.

This is mainly due to the fact that these tyres have, on the sidewall, a raised band intended to rest on the edge of the rim, said band interfering with the surface of the tool blocking the sliding in the radial direction of the sidewall of the tyre.

This means both difficulty in mounting the tyre and the generation of great tensions on the carcass of the tyre that lead to an undesired weakening of its structure.

OBJECT AND SUMMARY OF THE INVENTION

The purpose of the present finding is to overcome the drawbacks of the prior art in a simple and rational way. The finding achieves said purpose by providing a tool for mounting a tyre on a rim, suitable for making it easier to insert the bead of the tyre inside the bead-stopping edge of the rim, comprising a body equipped with a fixed jaw and a mobile jaw to which means are operatively connected suitable for bringing said mobile jaw closer to said fixed jaw to lock said body to the edge of the rim, a base intended to be rested against the sidewall of the tyre is associated with said body, said base being fixedly connected to said body so as to be able to oscillate in the direction of the axis of the rim following the movement of the bead to promote the insertion thereof inside the bead-stopping edge to take it near to the channel of the rim.

Advantageously, thanks to the fact that the base can oscillate with respect to the jaws that lock the tool on the rim, during the mounting of the tyre, it is avoided that the carcass thereof be subjected to excessive and undesired tensions. Indeed, during the mounting of the tyre the base of the tool oscillates in the direction of the axis of the rim making it easier for the bead to slide towards the channel of the rim and avoiding the occurrence of undesired tensions in the carcass of the tyre.

Further characteristics of the finding are outlined in the claims.

BRIEF DESCRIPTION OF THE DRAWING

In order to better clarify the constructive and functional characteristics of the finding hereafter a preferred embodiment is described, given as a non-limiting example and illustrated in the attached tables of drawings.

FIG. 4 illustrates the section IV-IV of FIG. 3.

FIG. 5 illustrates a front view of the finding.

DETAILED DESCRIPTION OF THE PREFERRED EMBODIMENT(S) OF THE INVENTION

Figure 1:
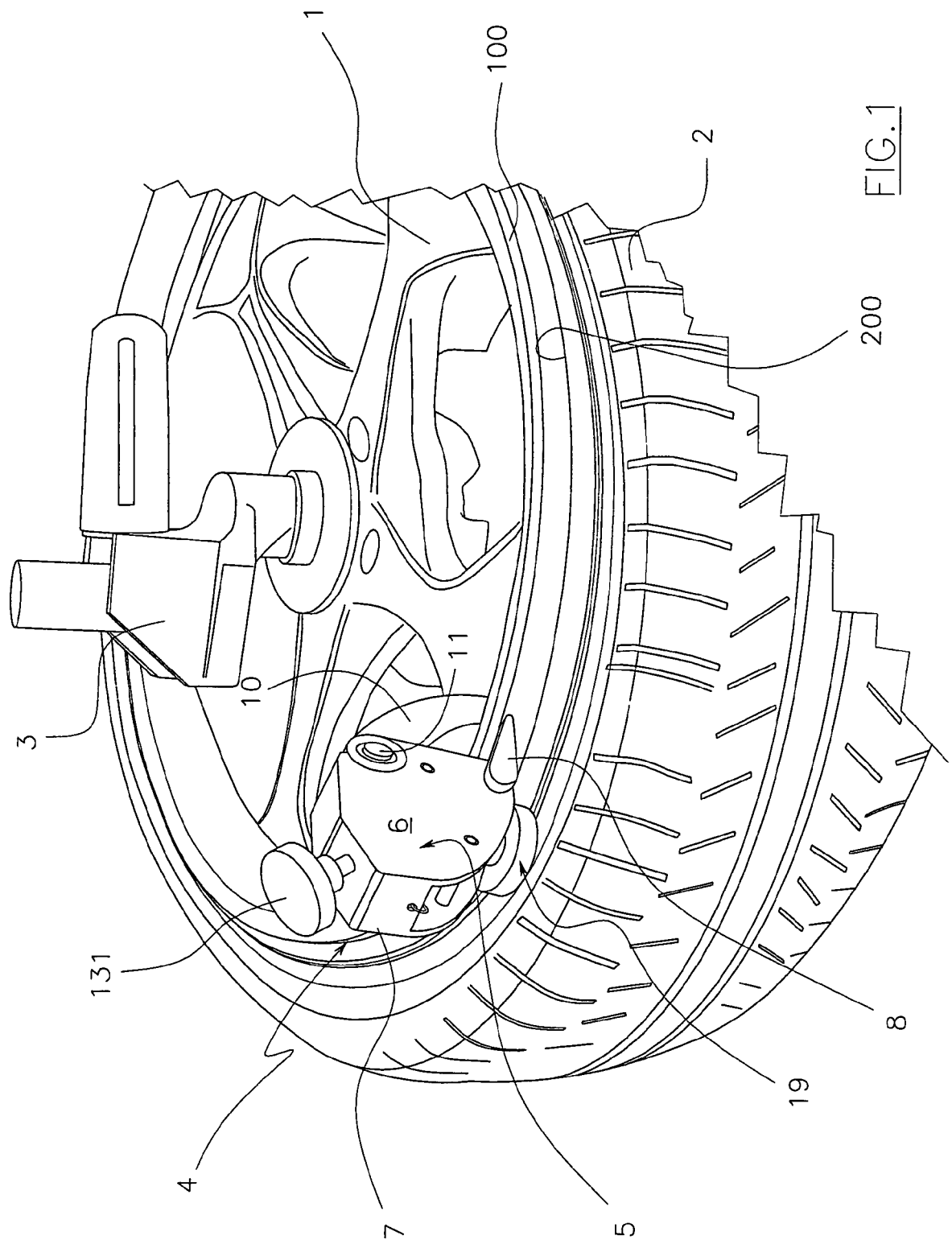
FIG. 1 shows a schematised perspective view of the device according to the finding during the mounting of the tyre onto the rim.

From the aforementioned figures it is possible to see the rim 1, on which a tyre 2 of the Run Flat type is partially slotted.

The rim 1 is supported and locked by a normal device 3, of a tyre-dismounting machine that is not illustrated. Hereafter the support 3 used in the illustrated embodiment of the finding shall not be described, since it is described in Italian patent application for an Industrial Invention No. RE2000A000051 filed to the same Applicant.

Fixed onto the bead-stopping edge 100 of the rim 1 is the suitable tool 4 that has the function of making the insertion of the bead 200 of the tyre 2 inside the bead-stopping edge 100 of the rim 1 easier by directing it towards the channel of the rim itself.

Figure 3:
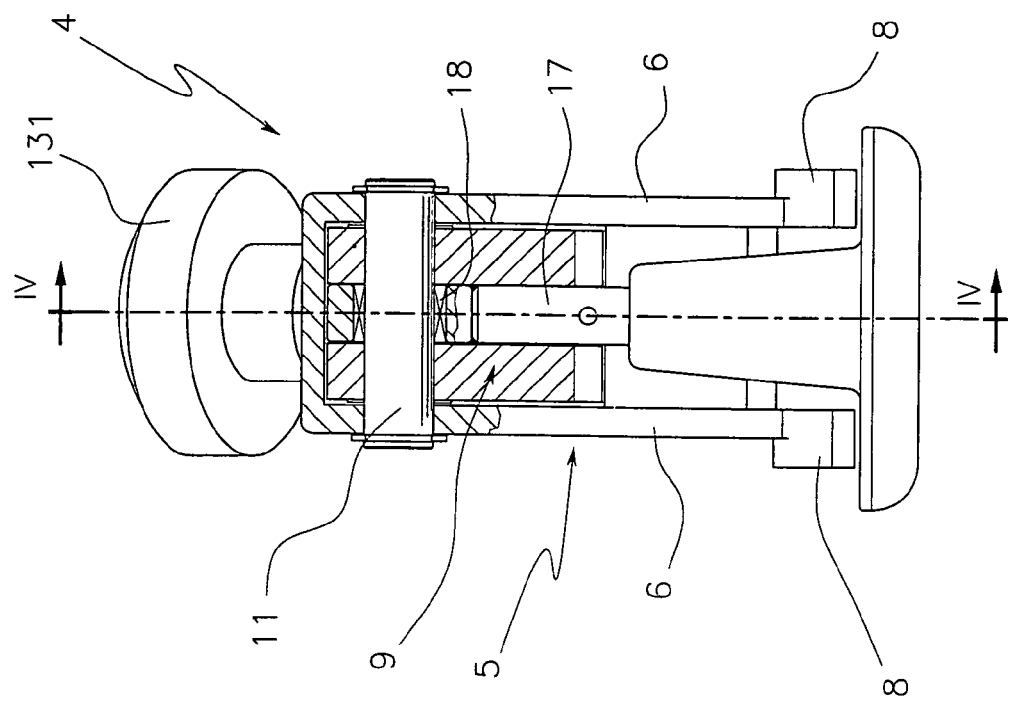
FIG. 3 illustrates the section III-III of FIG. 2.
Figure 2:
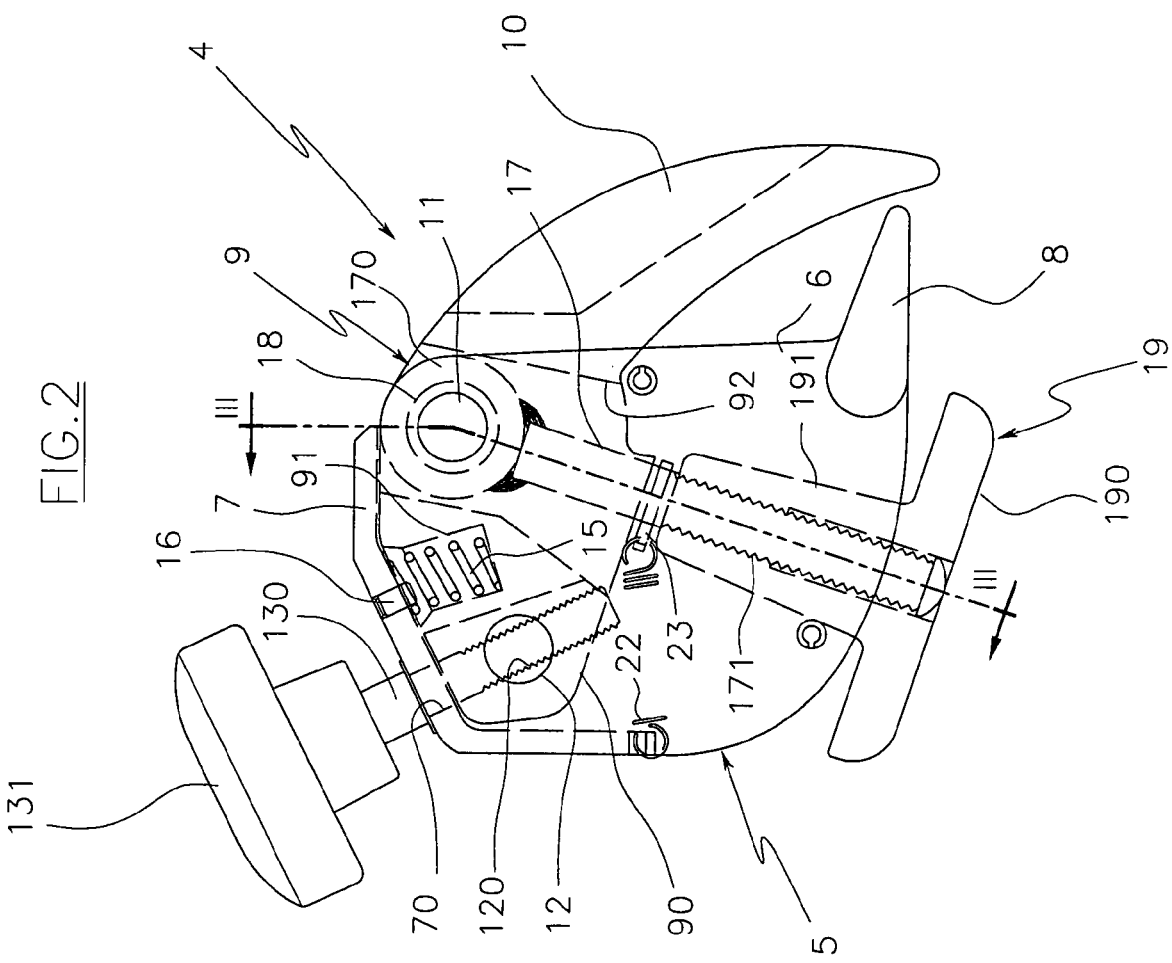
FIG. 2 illustrates a side view of the finding.

The tool 4 (FIGS. 2, 3 and 4) comprises an outer body 5 consisting of two identical plates 6 joined together by a shaped element 7. Below each plate 6 a tooth 8 is provided, fixed canti-levered and projecting in front of the plates 6 themselves. The two teeth 8 make a fixed jaw with which the tool 4 is provided.

Between the plates 6 a second body 9 is received the front portion of which sticks out from the two plates 6 and defines a mobile jaw 10 suitable for being brought towards and/or away from the two teeth 8 that constitute the fixed jaw.

Said second body 9 is fixedly connected to the plates 6 thanks to a pin 11 so as to be able to rotate with respect to the plates.

Figure 6:
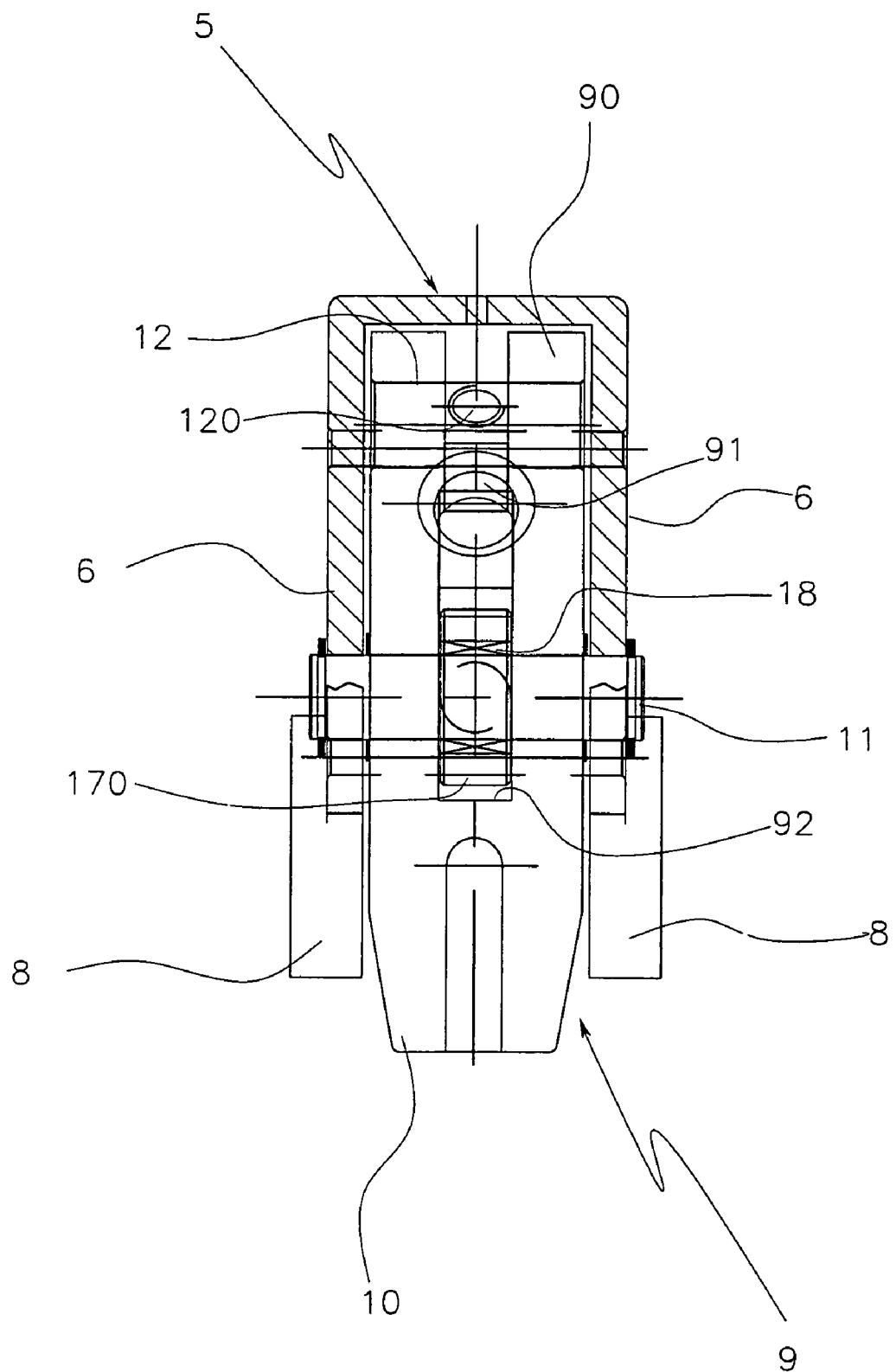
FIG. 6 illustrates a partially sectioned plan view of the finding.

With reference to FIG. 6, at the back the body 9 has a fork 90 that receives a second pin 12, which has a threaded central hole 120 with which the actuation means 13 are associated that allow the rotation of the body 9 with respect to the outer body 5.

Said actuation means 13 comprise a screw 130 that is slotted into a hole 70, of the element 7 that joins the two plates 6, and the upper free end of which carries a maneuvering handle 131. The lower end of the screw 130 is threaded and screwed into the matching threaded hole 120 of the pin 12.

The body 9 also has a recess 91 that is open on top and that receives a spring 15 that is compressed between the bottom of the recess 91 and the lower surface of the element 7. The function of the spring 15 is to keep the threads of the hole 120 of the pin 12 always in contact against the threads of the screw 130. Said spring 15 is always kept in the correct position by a grain 16 screwed into a threaded hole of the element 7 and the lower end of which is slotted between the spirals of the spring 15 itself.

With reference to FIGS. 4 and 6, the body 9 has, at the pin 11, a through opening 92 in which a shaft 17 is received. In particular, the shaft 17 has a cylindrical upper portion 170 that is slotted onto the pin 11 with the interposition of a cage of rollers 18.

At the bottom the shaft 17 has, on the other hand, a threaded portion 171 onto which a base 19 is screwed.

The base 19 comprises a discoidal lower portion 190 arranged below the plates 6 and a threaded upper band 191 that is screwed onto the shaft 17.

Thanks to the fact that the base 19 is screwed onto the shaft 17 it is possible to adjust its position and therefore the intensity of the force with which the discoidal portion 190 of the base 19 acts on the sidewall of the tyre 2. For this purpose indeed it is sufficient to unscrew or screw the base 19 onto the shaft 17.

The shaft 17 can oscillate between two extreme positions delimited by two limit switch pins 20 and 21. When the tool 4 is not used normally the shaft 17 is kept rested against the pin 20 thanks to the action of a traction spring 22 one end of which is fixedly connected to the element 7 and the other end of which is restrained by the shaft 17 through a split pin 23 (FIG. 4).

The operation of the finding is quite simple, indeed it is sufficient for the operator to lock the tool 4 onto the bead-stopping edge 100 of the rim 1 taking care that the base 19 is in the rest position illustrated in FIG. 4.

Thereafter, the rim 1 is made to rotate by actuating the tyre-dismounting machine and simultaneously the tool that takes care of pressing on the sidewall of the tyre 2. During the rotation of the rim 1 the base 19 oscillates towards the axis of the rim from the initial rest position, in which the shaft 17 rest on the pin 20, to the advanced position in which the shaft 17 rests on the pin 21. This oscillation, which is gradual during the rotation of the rim, makes the bead of the tyre 2 easier to direct in the direction of the bead-stopping edge 100 of the rim 1 allowing it to be inserted below the edge 100 itself and inside the channel of the rim.

The invention claimed is:

1. A tool adapted to mount a tyre onto a rim by facilitating insertion of a bead of the tyre under a bead-stopping edge of the rim and inside a channel of the rim, comprising:
   a body equipped with a fixed jaw and with a mobile jaw to which actuation means are operatively connected suitable for taking said mobile jaw closer to said fixed jaw to lock said body to the edge of the rim,
   a base adapted to rest on a sidewall of the tyre is associated with said body, said base being hinged to said body to oscillate with respect to said body to facilitate insertion of the bead inside the bead-stopping edge of the rim, wherein said mobile jaw and said base are hinged to said body on a common axis.

2. The tool according to claim 1, wherein said base has a discoidal lower portion.

3. The tool according to claim 1, wherein said base is associated with said body and has regulation means that regulate a distance between said base and a lower end of said body.

4. The tool according to claim 1, wherein said base is associated with said body by a shaft that has a cylindrical portion engaged on a pin and a threaded portion with which said base is associated.

5. The tool according to claim 4, wherein said shaft is normally kept in a rest position spaced apart from the axis of the rim by a spring, and moves closer to said axis during the insertion of the tyre.

6. The tool according to claim 1, wherein said mobile jaw is associated with said body through a pin about which it can oscillate.

7. The tool according to claim 1, wherein said fixed jaw has two teeth that are parallel to each other.

* * * * *